United States Patent [19]

Sakamoto et al.

[11] Patent Number: 5,230,954
[45] Date of Patent: Jul. 27, 1993

[54] FIRE-PROTECTION AND SAFETY COMPOSITE GLASS PANEL

[75] Inventors: Akihiko Sakamoto; Kiyoshi Katagi; Takehiro Shibuya, all of Shiga, Japan

[73] Assignee: Nippon Electric Glass Co., Ltd., Otsu, Japan

[21] Appl. No.: 813,805

[22] Filed: Dec. 26, 1991

[30] Foreign Application Priority Data

Dec. 26, 1990 [JP] Japan .................................. 2-414822
Sep. 6, 1991 [JP] Japan .................................. 3-255749

[51] Int. Cl.[5] .......................... B32B 17/10; B32B 27/8
[52] U.S. Cl. .................................... 428/332; 428/421; 428/422; 428/442
[58] Field of Search ............... 428/421, 422, 442, 426, 428/332

[56] References Cited

U.S. PATENT DOCUMENTS 4,341,841 7/1982 Ohno et al. ..................... 428/426
4,606,955 8/1986 Eastman et al. .................. 428/424

Primary Examiner—Thomas J. Herbert, Jr.
Attorney, Agent, or Firm—Hopgood, Calimafde, Kalil, Blaustein & Judlowe

[57] ABSTRACT

A fire protective glass panel for use in a fire protective window, door, and partition wall, which comprises at least one sheet of fireproof glass plate and a fluorocarbone resin film of a chain molecular structure type bonded to a side surface of the glass plate and which has non-shattering property as well as fire protection property wherein the fireproof glass plate is a heat-resistant and light transparent crystallized glass plate or, alternatively, the fireproof glass plate is a wire glass plate and the fluorocarbone resin film has a thickness of 0.02-1 mm and is made of one of FEP, PFA, PCTFE, ETFE, and PVDF.

17 Claims, 6 Drawing Sheets

FIRE-PROTECTION AND SAFETY COMPOSITE GLASS PANEL

BACKGROUND OF THE INVENTION

The present invention relates to a glass panel for fire protection and, in particular, to such a glass panel having nonshattering property as well as fire resistant or fireproof property.

In order to prevent the spreading of fire, a door, a window, or a partition wall are made of fire resistant or fire proof materials, for example, iron or steel. However, iron and steel are not light transparent and are, therefore, not desired for the window. Further, the door and the partition are often desired to be made of light transparent materials.

As a glass material for use in fire protection doors, windows, partitions and other fire protection structures, a fireproof or fire resistant glass plate is known in the art. A typical one of the fireproof glass plate is a wire glass which is a sheet glass with woven wire mesh embedded in the center of the sheet. Another type of the fireproof glass plate is made of a heat-resistant and light transparent crystallized glass plate. As one of the crystallized glass, "Fire Lite" glass plate which is made by Nippon Electric Glass Company Limited, a corporation in Japan, and is available in commerce. The crystallized glass consists of 3–5 wt. % $Li_2O$, 20–35 wt. % $Al_2O_3$, 55–70 wt. % $SiO_2$, 1–3 wt. % $TiO_2$, 1–4 wt. % $ZrO_2$, 1–5 wt. % $P_2O_5$, 0–4 wt. % $Na_2O$, and 0–4 wt. % $K_2O$, but a total amount of $Na_2O$ and $K_2O$ being 0.5–4 wt. %. The crystallized glass contains the beta-quartz or beta-eucriptite solid solution crystals. The crystallized glass is disclosed as a heat resistant glass in U.S. Pat. No. 3,282,712. The crystallized glass plate has been tested according to the Notification No. 1125 of the Ministry of Construction of Japan and allowed to be used as a fireproof glass for use in a fire protective door, window, partition and other fire protections.

A conventional soda glass plate is low in mechanical impact resistance and in thermal shock. Therefore, it is readily broken and shattered by impact or shock. A safety glass is also known in the art which is improved in the mechanical strength and has nonshattering property. As typical safety glasses, there is known a laminated glass and a glass covered with a thin plastic film. However, such safety glasses do not provide fire protection. Although the wire glass is effective as a safety glass, it tends to broken by a certain strength of mechanical impact to form a through hole. Therefore, the wire glass is not sufficient for the safety glass.

SUMMARY OF THE INVENTION

Therefore, it is an object of the present invention to provide a fire protection glass panel which is excellent in the resistance and mechanical strength.

According to the present invention, a fire-protection and safety composite glass panel is obtained which comprises a fireproof glass plate with opposite side surfaces and a layer of fluorocarbon resin film of a chain molecular structure type bonded on one of the opposite side surfaces.

The fireproof glass plate is made of a heat-resistant and light transparent crystallized glass, or alternatively, a wire glass.

The fluorocarbon resin film is made of one of fluorinated ethylene propylene (FEP), tetrafluoroethylene perfluoroalkoxyl ethylene copolymer (PFA), polychlorotrifluoroethylene (PCFE), ethylene tetrafluoroethylene copolymer (ETFE), and polyvinyliden fluoride (PVDF).

The fluorocarbon resin film preferably has a thickness of 0.02–1 mm.

According to another aspect of the present invention, a fire-protection and safety composite glass panel is obtained which comprises a plurality of glass plates laminated with a layer of fluorocarbon resin film of the chain molecular structure type between adjacent glass plates. At least one of the glass plates is the fireproof glass plate.

According to further aspects of the present invention, a fire protective door or window is obtained which comprises the composite glass panel and a frame for supporting the composite glass panel.

DESCRIPTION OF THE INVENTION

Briefly speaking, the present invention attempts to provide the safety or nonshattering property to a fireproof or fire-resistant glass plate by laminating a layer of the fluorocarbon resin film of a chain molecular structure type thereto.

The fluorocarbone resin of the chain molecular structure type has a unit structure represented by the following:

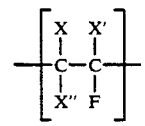

where X, X', and X" are one of H, Cl, F, —CF3, —O—CF2—CF2—CF3, and the like.

Because of a strong interatomic binding of such as C—C and C—F, and of a barrier effect of F atoms covering the carbon chain, the fluorocarbon resin is incombustible. The fluorocarbon resin is known to have excellent chemical stability, heat resistance, wear resistance, light transparence, and mechanical properties such as extension and tensile strength.

The fluorocarbon resin film can be joined onto a surface of the fireproof or fire resistant glass plate by the thermo compression bonding or by use of adhesive agent. Even if a combustible adhesive is used, it is covered with the incombustible fluorocarbon resin film and it is prevented from firing. When the fluorocarbon film is melted by the further heating, the molten fluorocarbon resin encloses the adhesive so that the adhesive is also prevented from firing.

The resultant composite glass plate has the fluorocarbon resin film laminated onto the glass plate and is provided with the nonshattering property and excellent impact absorption without reduction of incombustibility, light transparence, chemical stability and others. Therefore, the composite glass panel is useful for fire protective windows, doors, partitions and others. Further, it is provided with high mechanical strength and nonshattering property and is, therefore, useful as a safety or nonshattering glass plate for windows, doors, and other partition walls.

As several examples of the fluorocarbon resin of the chain molecular structure type, there are known, as typical ones, fluorinated ethylene propylene (FEP), tetrafluoroethylene perfluoroalkoxyl ethylene copolymer (PFA), polychlorotrifluoroethylene (PCFE), ethylene tetrafluoroethylene copolymer (ETFE), and polyvinyliden fluoride (PVDF).

The fluorocarbon resin film used in the present invention can have a desired thickness but preferably, of 0.02–1 mm thickness.

Now, description will be made as to examples of the present invention and comparative examples.

EXAMPLE 1

Figure 1:
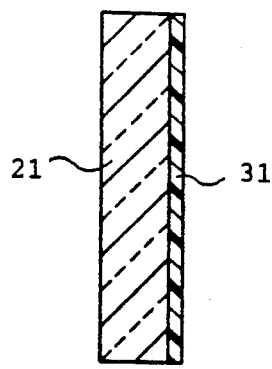
FIGS. 1 to 9 and 10 are cross-sectional views of samples in examples of Nos. 1 to 9 and 10.

Referring to FIG. 1, a sheet of "Fire Lite" glass plate 21, that is a heat-resistant light transparent crystallized glass plate, was prepared with a dimension of 2000×900×5 mm. A PFA film 31 with a thickness of 50 μm was bonded onto one side surface of the glass sheet or plate 21 to form a sample of a composite glass panel. The bonding was performed by the use of thermo compression bonding at a pressure of 12 Kg/cm² at a temperature of 330° C.

EXAMPLE 2

Figure 2:
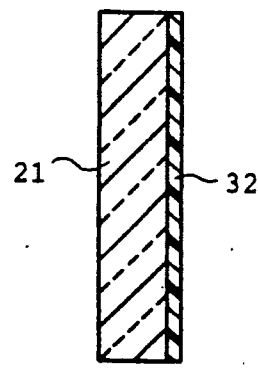

Referring to FIG. 2, an FEP film 32 with a thickness of 100 μm was bonded by a silicone adhesive agent onto one surface of the glass plate 21 similar to that in Example 1 to form a sample of the composite glass panel.

EXAMPLE 3

Figure 3:
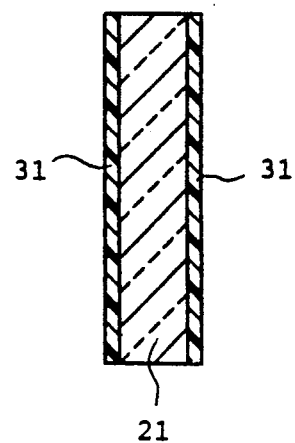

Referring to FIG. 3, a sheet of "Fire Lite" glass plate 21 was prepared with a dimension of 2000×900×8 mm. Two sheets of PFA film 31 with a thickness of 50 μm were bonded by use of acrylic adhesive onto both side surfaces of the glass plate 21 to form a sample of a composite glass panel.

EXAMPLE 4

Figure 4:
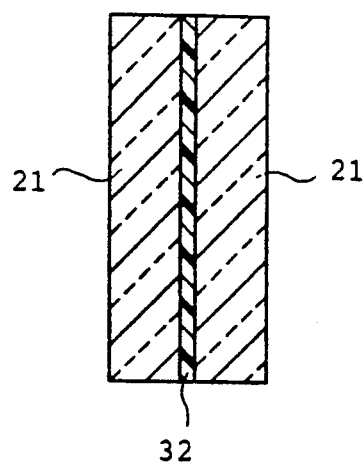

Two "Fire Lite" glass plates 21 similar to that in FIG. 1 were prepared. Referring to FIG. 4, a film 32 of FEP with a thickness of 125 μm was held between those two glass plates 21 and was bonded thereto to form a sample of the composite glass panel. The bonding was performed by the thermo compression bonding by a pressure of 12 Kg/cm² at a temperature 280° C.

EXAMPLE 5

Figure 5:
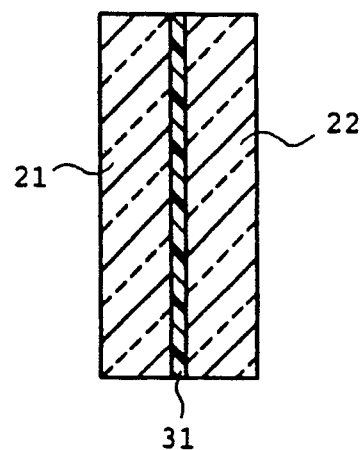

The "Fire Lite" glass plate 21 similar to that in Example 1 and a sheet of conventional soda glass plate 22 with a dimension of 2000×900×3 mm were prepared. Referring to FIG. 5, a film 31 of PFA with a thickness of 150 μm was held between the glass plates 21 and 22 and was bonded thereto to form a sample of the composite glass panel. The bonding was performed by the thermo compression bonding by a pressure of 12 Kg/cm² at a temperature 330° C.

EXAMPLE 6

Figure 6:
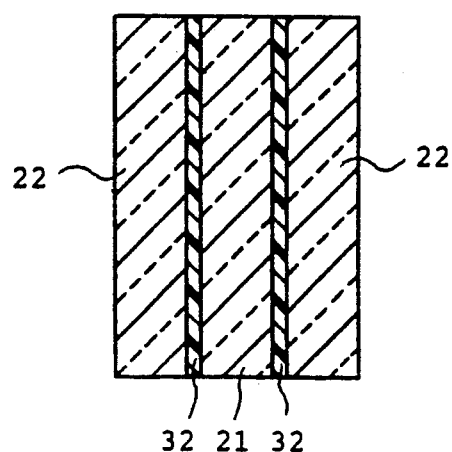

The "Fire Lite" glass plate 21 similar to that in Example 1 and two sheets of soda glass plate 22 with a dimension of 2000×900×6 mm were prepared. Referring to FIG. 6, the "Fire Lite" glass plate 21 was interposed between two soda glass plates 22 and 22. Two films 32 of FEP with a thickness of 200 μm were held between the glass plates 22 and 21 and between glass plates 21 and 22. Then, those three glass plates were bonded through those FEP films 32 to form a laminated glass panel as a sample of the composite glass panel. The bonding was performed by the thermo compression bonding by a pressure of 12 Kg/cm² at a temperature 280° C.

EXAMPLE 7

Figure 7:
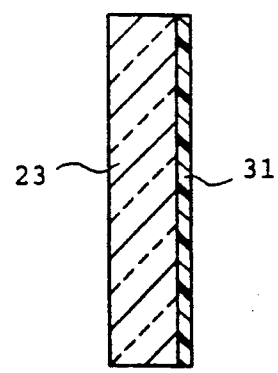

A piece of wire glass plate 23 with a dimension of 1900×900×6.8 mm was cut from a wire glass plate which was available in commerce. Referring to FIG. 7, a film 31 of PFA with a thickness of 50 μm was bonded onto one side surface of the wire glass plate piece 23. The bonding was performed by means of thermo compression bonding at a pressure of 12 Kg/cm² at a temperature 330° C.

EXAMPLE 8

Figure 8:
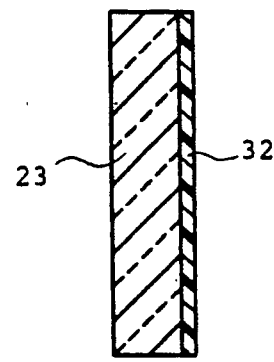

Referring to FIG. 8, a film 32 of FEP with a thickness of 100 μm was bonded by use of a silicone adhesive agent onto one side surface of the wire glass plate piece 23 similar to that in Example 7 to form a sample of a composite glass panel according to the present invention.

EXAMPLE 9

Figure 9:
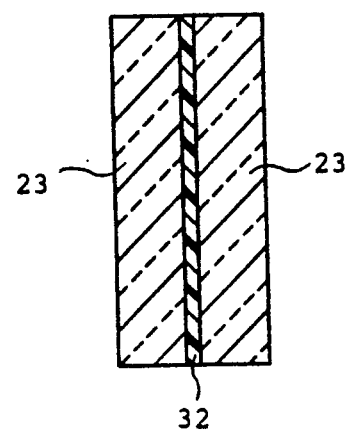

Referring to FIG. 9, a film 32 of FEP with a thickness of 125 μm was held between two pieces of wire glass plate 23 similar to that in Example 7 and was bonded thereto under a pressure of 12 Kg/cm², at a temperature of 280° C. Thus, a sample of the composite glass panel was produced.

EXAMPLE 10

Figure 10:
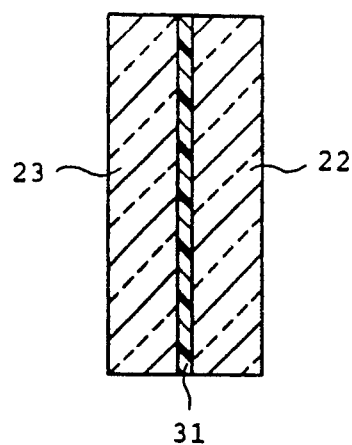

Referring to FIG. 10, a film 31 of PFA with a thickness of 150 μm was held between a wire glass piece 23 similar to that in Example 7 and a soda glass piece 22 with a dimension of 1900×900×5 mm and was bonded thereto under a pressure of 12 Kg/cm² at a temperature of 330° C. Thus, a sample of the composite glass panel.

COMPARATIVE EXAMPLE 1

Figure 11:
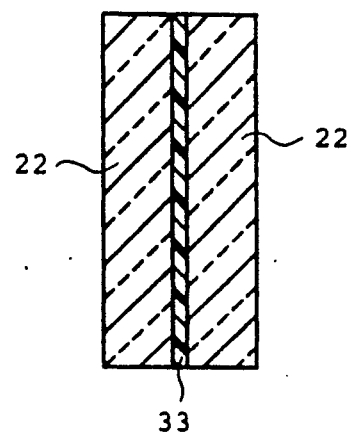
FIGS. 11 to 13 and 14 are cross-sectional views of samples in comparative examples of Nos. 1 to 3 and 4.

Two pieces of soda glass plate 22 was cut out with a dimension of 2000×900×5 mm. Referring to FIG. 11, a film 33 of polyvinyl butyral (PVB) with a thickness of 1 mm was held between the soda glass plate pieces 22 and was bonded thereto under a pressure of 12 Kg/cm² at a temperature of 170° C. Thus, a comparative sample was produced.

COMPARATIVE EXAMPLE 2

Figure 12:
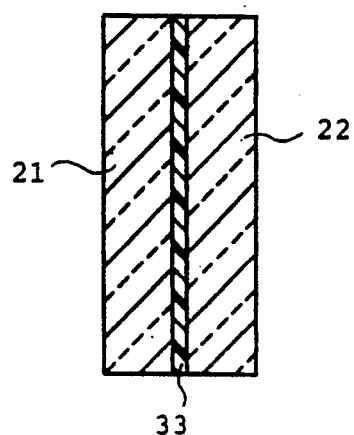

Referring to FIG. 12, a PVB film 33 with a thickness of 1 mm was held between a "Fire Lite" glass plate piece 21 similar to that in Example 1 and a soda glass plate piece 22 of a dimension of 2000×900×3 mm and was bonded thereto under a pressure of 12 Kg/cm² at a temperature of 170° C. Thus, a comparative sample was produced.

COMPARATIVE EXAMPLE 3

Figure 13:
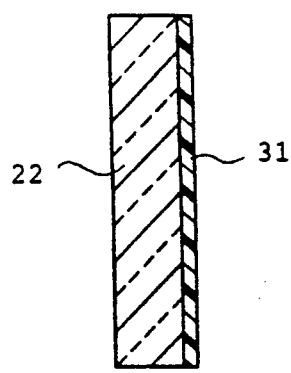

Referring to FIG. 13, a PFA film 31 with a thickness of 50 μm was bonded onto a side surface of a soda glass plate piece 22 under a pressure of 12 Kg/cm² at a temperature of 330° C. Thus, a comparative sample was produced.

COMPARATIVE EXAMPLE 4

Figure 14:
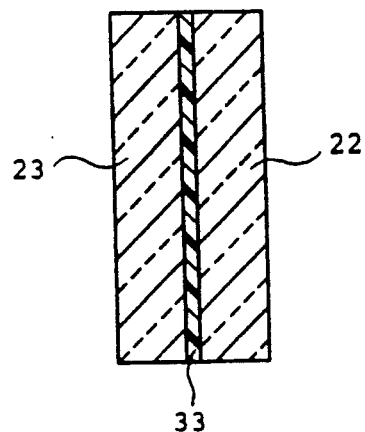

Referring to FIG. 14, a PVB film 33 with a thickness of 1 mm was held between a wire glass plate piece similar to that in Example 7 and a soda glass plate piece 22 with a dimension of 1900×900×5 mm and was bonded under a pressure of 12 Kg/cm² at a temperature of 170° C. Thus, a comparative sample was produced.

These samples and comparative samples were subjected to the following impact-resistant, firing, smoking, and fire-resistant tests.

Figure 15:
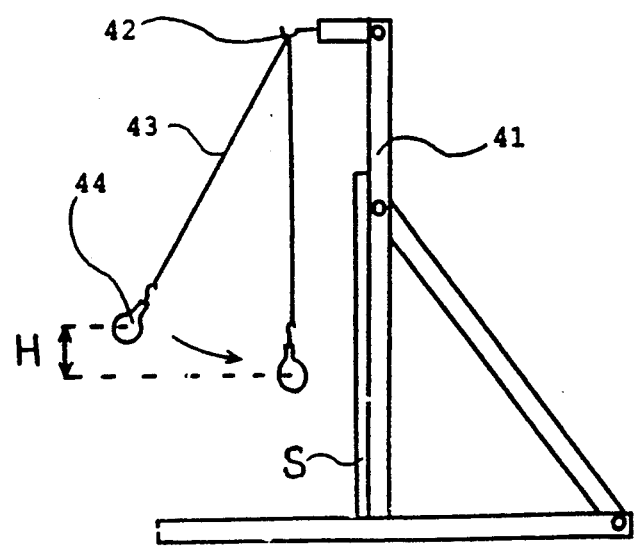
FIG. 15 is a view illustrating impact resistant test of samples.

Now, the impact-resistant test will be described. Referring to FIG. 15, one of those samples and comparative samples in the above-described Examples and Comparative Examples is disposed as a test piece S at a predetermined position of an iron frame 41. The iron frame 41 has a hook 42 on its top to which an end of a wire 43 is connected while a weight 44 being connected to the other end of the wire 43. The weight has a mass of 45 Kg. A distance is adjusted 1524 mm from the hook 42 to the centroid of the weight 44. The weight 44 and the wire 43 are turned about the hook 42 so that the weight 44 is brought up at a level H higher than a free position. Then, the weight 44 is freed and collides with the test piece S. The collision is repeated with gradual increase of the level H one by one. The impact resistant factor of the test piece S is represented by the maximum level $H_{max}$ of the weight which cannot make a through hole in the test piece but makes a total amount of broken and fallen glass fragments 50 grams or less.

The firing and the smoking tests are carried out by heating a test piece in a gas heating furnace according to the standard heating curve by the Notification No. 1125 of the Ministry of Construction of Japan. The test piece is observed as regards whether or not the test piece smokes and fires.

The fire-resistant test is carried out by heating one side surface of the test piece by a gas firing flame according to the standard heating curve and observing whether or not a through hole is made in the test piece and whether or not firing flame blows to an opposite side surface of the test piece. The time duration from start of heating to occurrence of any one of those phenomena represents the fire-resistant factor of the test piece.

Table 1 shows a result of those tests for the samples and comparative samples in the above-described Examples 1-10 and Comparative Examples 1-4.

According to the test result shown in Table 1, the samples in Examples 1-10 by the present invention are excellent in the impact resistance and do neither fire nor smoke. Further, the samples of Examples 1-6 have a fire resistance of 180 minutes or more and samples of Examples 7-10 have a fire resistance of 20 minutes or more. However, the samples of Comparative Examples 1-4 have a degraded fire resistance although they are excellent in the impact resistance. In the comparative sample 1, both of soda glass plate pieces 22 thermally cracked to form a through hole about 8 minutes after heating start. In the comparative sample 2, a soda glass plate piece 22 at a nonheated side thermally cracked and falled off about 6 minutes after heating start and then the PVB film 33 was evaporated and fired. In the comparative sample 3, the soda glass plate piece 22 thermally cracked about three minutes and falled off about six minutes after heating start. In the comparative sample 4, the soda glass plate piece 22 at the nonheated side thermally cracked after heating start and the PVB film was evaporated and fired about five minutes after heating start.

Figure 16:
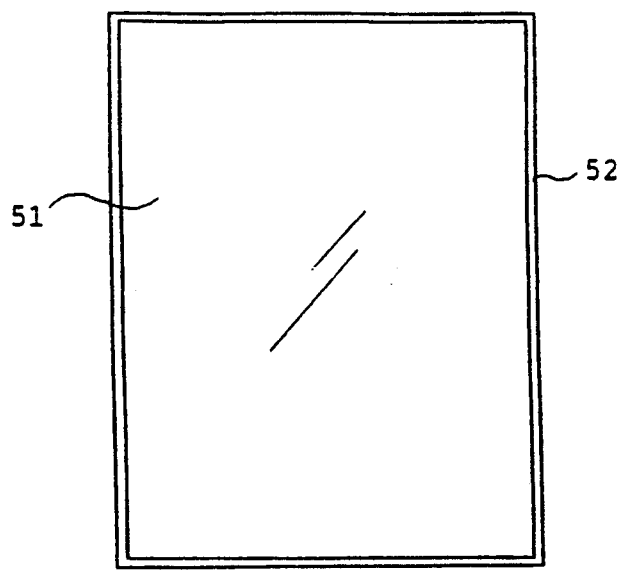
FIG. 16 is a front view of a fire-protective window using the composite glass panel according to the present invention.

Referring to FIG. 16, a window is shown which comprises a glass plate 51 and a sash 52 for the glass plate 51. The composite glass panel according to the present invention is used for the glass plate so that the window is a fire protective and safety window.

Figure 17:
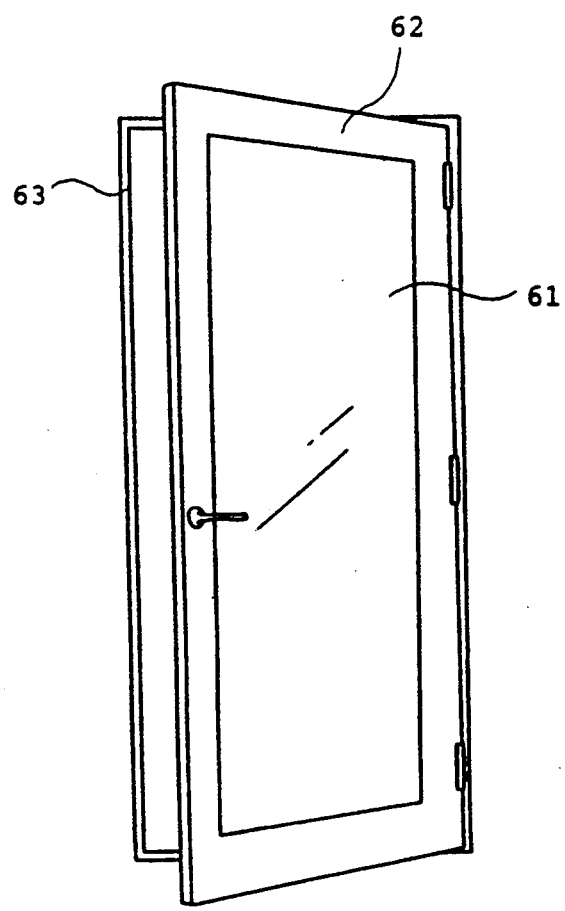
FIG. 17 is a perspective view of a fire-protective door using the composite glass panel according to the present invention.

Referring to FIG. 17, a fire protection and safety door is also shown which comprises a glass plate 61 made of the composite glass panel and a door frame 62. The door is installed in an opening 63.

What is claimed is:

1. A fire-protection and safety composite glass panel comprising a fireproof glass plate with opposite side surfaces and a film layer of fluorocarbon resin of a chain molecular structure type bonded on one of said opposite side surfaces, said panel being light transparent.

2. A composite glass panel as claimed in claim 1, which further comprises another layer of said fluorocarbone resin film bonded on the other side surface.

3. A composite glass panel as claimed in claim 1, wherein said fireproof glass plate is made of a wire glass.

4. A composite glass panel as claimed in claim 1, wherein said fluorocarbone resin film is made of one of fluorinated ethylene propylene (FEP), tetrafluoroethylene perfluoroalkoxyl ethylene copolymer (PFA), polychlorotrifluoroethylene (PCFE), ethylene tetrafluoroethylene copolymer (ETFE), and polyvinyliden fluoride (PVDF).

5. A composite glass panel as claimed in claim 1, wherein said fluorocarbone resin has a thickness of 0.02-1 mm.

6. A composite glass panel as claimed in claim 1, wherein said fireproof glass plate is made of a heat-resistant and light transparent crystallized glass.

7. A composite glass panel as claimed in claim 6, wherein said crystallized glass consists of 3-5 wt. % $Li_2O$, 20-35 wt. % $Al_2O_3$, 55-70 wt. % $SiO_2$, 1-3 wt. % $TiO_2$, 1-4 wt. % $ZrO_2$, 1-5 wt. % $P_2O_5$, 0-4 wt. % $Na_2O$, and 0-4 wt. % $K_2O$, but a total amount of $Na_2O$

TABLE 1

| | Examples | | | | | | | | | | Comparative Examples | | | |
|---|---|---|---|---|---|---|---|---|---|---|---|---|---|---|
| | 1 | 2 | 3 | 4 | 5 | 6 | 7 | 8 | 9 | 10 | 1 | 2 | 3 | 4 |
| Impact resistance (cm) | 30 | 50 | 80 | 100 | 140 | 50 | 50 | 65 | 80 | 80 | 120 | 120 | 30 | 110 |
| Firing | No | No | No | No | No | No | No | No | No | No | Yes | Yes | No | Yes |
| Smoking | No | No | No | No | No | No | No | No | No | No | Yes | Yes | No | Yes |
| Fire resistance (minutes) | over 180 | over 180 | over 180 | over 180 | over 180 | over 180 | over 20 | over 20 | over 20 | over 20 | 8 | 6 | 6 | 5 | and K$_2$O being 0.5–4 wt. %, said crystallized glass containing beta-quartz solid solution crystals.

8. A fire-protection and safety composite glass panel comprising a plurality of glass plates laminated with a layer of fluorocarbon resin film of a chain molecular structure type between adjacent glass plates, at least one of said glass plates being a fireproof glass plate.

9. A composite glass panel as claimed in claim 8, wherein said fireproof glass plate is made of a wire glass.

10. A composite glass panel as claimed in claim 8, wherein said fluorocarbone resin film is made of one of fluorinated ethylene propylene (FEP), tetrafluoroethylene perfluoroalkoxyl ethylene copolymer (PFA), polychlorotrifluoroethylene (PCFE), ethylene tetrafluoroethylene copolymer (ETFE), and polyvinyliden fluoride (PVDF).

11. A composite glass panel as claimed in claim 8, wherein said fluorocarbon resin film has a thickness of 0.02–1 mm.

12. A composite glass panel as claimed in claim 8, wherein said fireproof glass plate is made of a heat-resistant and light transparent crystallized glass.

13. A composite glass panel as claimed in claim 12, wherein said crystallized glass consists of 3–5 wt. % Li$_2$O, 20–35 wt. % Al$_2$O$_3$, 55–70 wt. % SiO$_2$, 1–3 wt. % TiO$_2$, 1–4 wt. % ZrO$_2$, 1–5 wt. % P$_2$O$_5$, 0–4 wt. % Na$_2$O, and 0–4 wt. % K$_2$O, but a total amount of Na$_2$O and K$_2$O being 0.5–4 wt. %, said crystallized glass containing beta-quartz solid solution crystals.

14. A fire protective window comprising a window glass and a sash for said window glass, said window glass comprising a fireproof glass plate with opposite side surfaces and a layer of fluorocarbon resin film of a chain molecular structure type bonded on one of said opposite side surfaces.

15. A fire protective window as claimed in claim 14, wherein said window glass comprises a plurality of glass plates laminated with a layer of fluorocarbon resin film of a chain molecular structure type between adjacent glass plates, at least one of said glass plates being a fireproof glass plate.

16. A fire protective door comprising a glass panel and a frame for said glass panel, said glass panel comprising a fireproof glass plate with opposite side surfaces and a layer of fluorocarbone resin film of a chain molecular structure type bonded on one of said opposite side surfaces.

17. A fire protective door as claimed in claim 16, wherein said glass panel comprises a plurality of glass plates laminated with a layer of fluorocarbone resin film of a chain molecular structure type between adjacent glass plates, at least one of said glass plates being a fireproof glass plate.

* * * * *